United States Patent
Oliver et al.

(10) Patent No.: US 7,158,986 B1
(45) Date of Patent: Jan. 2, 2007

(54) METHOD AND SYSTEM PROVIDING USER WITH PERSONALIZED RECOMMENDATIONS BY ELECTRONIC-MAIL BASED UPON THE DETERMINED INTERESTS OF THE USER PERTAIN TO THE THEME AND CONCEPTS OF THE CATEGORIZED DOCUMENT

(75) Inventors: Jonathan Oliver, Oakland, CA (US); Rohan Baxter, Oakland, CA (US); Wray Buntine, Oakland, CA (US); Steven Waterhouse, San Francisco, CA (US)

(73) Assignee: MailFrontier, Inc. a wholly owned subsidiary of SonicWall, Inc., Sunnyvale, CA (US)

( * ) Notice: Subject to any disclaimer, the term of this patent is extended or adjusted under 35 U.S.C. 154(b) by 0 days.

(21) Appl. No.: 09/361,678

(22) Filed: Jul. 27, 1999

(51) Int. Cl.
G06F 17/00 (2006.01)
G06F 17/30 (2006.01)
G06F 15/16 (2006.01)
H04M 11/00 (2006.01)

(52) U.S. Cl. ................. 707/102; 707/1; 707/200; 379/93.24; 709/203

(58) Field of Classification Search ........... 707/1–7, 707/10, 100–104.1, 200–201; 715/500.1, 715/501.1, 510–513; 709/218–224, 203; 705/1–2, 10, 26–27; 713/200–202; 379/93.24–93.25, 379/100.08
See application file for complete search history.

(56) References Cited

U.S. PATENT DOCUMENTS

| | | | |
|---|---|---|---|
| 5,164,897 A | | 11/1992 | Clark et al. |
| 5,598,557 A | | 1/1997 | Doner et al. |
| 5,659,766 A | | 8/1997 | Saund et al. |
| 5,727,129 A | * | 3/1998 | Barrett et al. ............. 706/10 |
| 5,754,938 A | | 5/1998 | Herz et al. |
| 5,754,939 A | | 5/1998 | Herz et al. |
| 5,796,952 A | | 8/1998 | Davis et al. |
| 5,854,630 A | | 12/1998 | Nielsen |
| 5,857,179 A | | 1/1999 | Vaithyanathan et al. |
| 5,867,799 A | | 2/1999 | Lang et al. |
| 5,913,215 A | * | 6/1999 | Rubinstein et al. ........... 707/10 |
| 5,978,799 A | * | 11/1999 | Hirsch ............................ 707/4 |
| 6,029,141 A | * | 2/2000 | Bezos et al. ................. 705/27 |
| 6,115,709 A | * | 9/2000 | Gilmour et al. ................ 707/9 |
| 6,125,173 A | * | 9/2000 | Jagadish et al. .......... 379/114.1 |
| 6,154,783 A | * | 11/2000 | Gilmour et al. ............ 709/245 |
| 6,202,083 B1 | * | 3/2001 | Chrabaszcz ................ 709/203 |
| 6,236,975 B1 | * | 5/2001 | Boe et al. ...................... 705/7 |
| 6,317,722 B1 | * | 11/2001 | Jacobi et al. ................. 705/14 |

(Continued)

FOREIGN PATENT DOCUMENTS

WO    WO 98/53624    * 11/1998    ............. 7/14

(Continued)

OTHER PUBLICATIONS

Qi et al., Efficient profile matching for large scale webcasting, computer networks and ISDN systems, 30, 1998 pp. 443-455.*

(Continued)

*Primary Examiner*—Srirama Channavajjala
(74) *Attorney, Agent, or Firm*—Carr & Ferrell LLP

(57) ABSTRACT

Systems and methods for providing a user with personalized recommendations of accessing electronic-mail at an electronic-mail document server are provided. Recommendations may be based on determined interests of the user based on the theme or concept of a previously categorized document, the previously categorized document having been previously accessed by the user.

18 Claims, 7 Drawing Sheets

U.S. PATENT DOCUMENTS

| | | | |
|---|---|---|---|
| 6,345,293 B1 * | 2/2002 | Chaddha | 709/219 |
| 6,401,096 B1 * | 6/2002 | Zellweger | 707/100 |
| 6,480,885 B1 * | 11/2002 | Olivier | 709/207 |
| 6,484,149 B1 * | 11/2002 | Jammes et al. | 705/26 |
| 6,493,702 B1 * | 12/2002 | Adar et al. | 707/3 |
| 6,654,735 B1 * | 11/2003 | Eichstaedt et al. | 707/3 |
| 6,692,359 B1 * | 2/2004 | Williams et al. | 463/42 |
| 6,801,929 B1 * | 10/2004 | Donoho et al. | 709/204 |
| 6,845,374 B1 * | 1/2005 | Oliver et al. | 707/5 |

FOREIGN PATENT DOCUMENTS

| | | | | |
|---|---|---|---|---|
| WO | WO 98/57490 | * | 12/1998 | |
| WO | WO 99/32985 | * | 7/1999 | 13/38 |
| WO | WO 00/30010 | * | 5/2000 | 17/60 |
| WO | WO 02/065327 | * | 8/2002 | |
| WO | WO 2004052010 | * | 6/2004 | 7/173 |

OTHER PUBLICATIONS

Hidekazu S, et al. Learning personal preferences on online newspaper articles from user behaviors, computer networks and ISDN systems 29, 1997 pp. 1447-1455.*

Christian K et al. WebAssist: a user profile specific information retrival assistant, short paper, computer networks and ISDN systems, 30 1998, pp. 654-655.*

Sung-Shun Weng et al. "personalized product recommendation in e-commerce", e-Technology, e-commence and e-service, IEEE 2004, Mar. 2004, pp. 413-420.*

Yi-Hung Wu et al. "enabling personalized recommendation on the web based interests and bahaviors", Research issues in data engineering, 2001 proceedings,workshop, Apr. 2001, pp. 17-24.*

Ambak,J.C. et al. "graphical correspondence in electronic-mail networkds using personal computers", Selected areas in communications, IEEE journal, vol. 7, issue: 2, 1989, pp. 257-267.*

Net Perceptions, 1 to 1 Marketing the Internet and Privacy, Software Development Forum commerce SIG, Jun. 29, 1999, 19 pages.

Intraware Presentation, "Personalized Ecommerce and Content Management," Jun. 10, 1999, 9 pages.

GuestTrack, Inc. Product Overview, "Web Personalization Software," 1996-1999, 3 pages.

Gustos Software, LLC, "Gustos Guide," 1996-1997, 9 pages.

Personify, Inc., "What is Personify," 1999, 1 page.

Responsys.com, "Power Your E-customer Interaction with Responsys Interact," 1999, 4 pages.

eHNC Software, Inc., "SelectCast," 1999, 2 pages.

Julie Keslik et al., "Inktomi Introduces First Customizable, Automated Directory Engine," 1999, 3 pages.

CNET Builder.com, "Personalizing Your Web Site—Degrees of Personalization," 1995-1999, 3 pages.

CNET, Inc., "Personalizing Your Web Site—What is Personalization?" 1995-1999, 2 pages.

Deborah Kania, "Putting Personalization to the Test," URL=http://www.searchz.com/Articles/0302991.shtml, 1999, pp. 1-7.

David S. Linthicum, "Using Personalization to Make Sites More Profitable," URL=http://www.ZDENT.com/computershopper/edit/cshopper/content/9903/387616.html, Mar. 1999, pp. 1-4.

Sharon Machlis, "Low Tech Marketing," URL=http://www.computerworld.com/home/print.nsf/all/9902018D, Feb. 1, 1999, pp. 1-2.

Scot Petersen, "Upgrade Strengthens Net.Analysis," PC Week Online, URL=wysiwyg://12/http://www.zdnet.com/pcweek/stories/news/0,4153,385022,00.html, Jan. 18, 1999, pp. 1-2.

Dana Blankenhorn, "Up Close and Personal, Finding the Right Tools for Customizing Web Content," Net Perceptions: Press-Release, New Media, Nov. 24, 1997, 2 pages, URL=www.newmedia.com/newmedia/97/15/buyersguide/personal_web_content.html.

Jesse Berst, "Why Personalization is the Internet's Next Big Thing," Apr. 14, 1998, 3 pages, URL=www.zdnet.com/anchordesk/story/story_1977.html.

Gustos Software, LLC, "Find Anything You Like Today?" 1996-1997, 10 pages.

Whit Andrews, "Personalized Agents Enable Preferred Surfing," Web Week, vol. 2, Issue 12, Aug. 19, 1996, 2 pages.

Matt Carmichael, "Survey of Developers Shows How Much it Costs to Add Personalization to Sites," CNET, Inc., URL=www.netb2b.com/cgu_bci/print_article.nt/article.nt/article/887, 1995-1997, 3 pages.

Richard Dean, "Personalizing your Web Site," Jun. 2, 1998, 2 pages, URL=www.builder.com/business/personal/index.html.

Harris Kravatz, "Taking Portals Personally: A Design Review," Webreview.com, Apr. 30, 1999, 2 pages.

E-commerce News, "e2 Software Helps 'Amazonify' E-Commerce Web Sites," Jun. 2, 1999, 5 pages, URL=www.e2software.com.

E-commerce News, "Comsumer E-Commerce Segment to Increase to $26 Billion by Year 2002," May 19, 1998, 5 pages, URL=www.e2software.com.

Netscape Netcenter, "What's Related FAQ," 1999, 6 pages.

Marko Balabanovic* et al., "An Adaptive Agent for Automated Web Browsing," Department of Computer Science, Stanford Univ., Digital Library Project, Working Paper SIDL-WP1995-0023, 1995, pp. 1-12.

Lee Sherman, "Practice Classified Information—Autonomy Agentware allows News Corp.'s LineOne to Create Real-Time Custom News," Knowledge Management, Nov. 1998, 4 pages.

Bowne Internet Solutions, "Open Sesame Technical White Paper," 1999, pp. 1-26.

Engage Technologies, Inc., "ProfileServer 4.0—Maximize the Internet Power of the Internet with Personalized Marketing Strategies," 1998-1999, 2 pages.

eHNC Software, Inc., "The Power Wallet—A Whitepaper on PowerWallett Technology," Jul. 14, 1999, pp. 1-9.

e2 Software Corporation, 1-to-1 Web Site Services—Hosted Internet Contact and Email Communication Services, 1999, 4 pages.

John Lalande, "Web Sites Get Personal—Customize Popular Pages to Reflect Your Interests," Smart Computing, Jul. 1999, vol. 10, Issue 7, pp. 84-87.

Reva Basch, "Cutting Through the Clutter—Master Search Engines to Find Exactly the Web Content You Need," Smart Computing, Jul. 1999, vol. 10, Issue 7, pp. 88-91.

Shumeet Baluja et al., "Applying Machine Learning for High Performance Named-Entity Extraction," Pacific Association for Computational Linguistics, 1999, pp. 1-14.

John S. Breese et al., "Empirical Analysis of Predictive Algorithms for Collaborative Filtering*," Proceedings of the Fourteenth Conference on Uncertainty of Artificial Intelligence, Jul. 1998, 10 pages.

Yonatan Aumann et al., "Predicting Event Sequences: Data Mining for Prefetching Web-Pages," Abstract, 1998, pp. 1-10.

Oren Zamir et al., "Fast and Intuitive Clustering of Web Documents*," Department of Computer Science & Engineering, Univ. Washington, American Association for Artificial Intelligence, 1997, 4 pages.

Press Release, URL=http://www.netperceptions.com/press/release/pr_19990423.html, Apr. 23, 1999.

Press Release, URL=http://www.netperceptions.com/press/release/pr_19981105_2.html, Nov. 5, 1998.

Data Sheet, Portal-In-A-Box™, "Autonomy's Automated Enterprise Information Portal," Autonomy, Inc., 1999, 4 pages, URL=www.autonomy.com.

"Personalization," Bowne Internet Solutions, 8 pp., presumed date prior to application filing date,—no publishing date.

"Our Technology," About AltaVista, 1999, 2 pp.

"The Open Sesame Profiling Server," Open Sesame Product Datasheet, 2 pp., presumed date prior to application filing date,—no publishing date.

Chan, P., "A Non-Invasive Learning Approach to Building Web User Profiles," Workshop on Web Usage Analysis and User Profiling, In the Proc. of the Fifth Int'l Conf. on Knowledge Discovery and Data Mining, San Diego, CA, 1999 6 pp.

Larsen, B. et al., "Fast and Effective Text Mining Using Linear-Time Document Clustering," In the Proc. of the 5th Int'l Conf. on Knowledge Discovery and Data Mining, San Diego, CA, 1999, pp. 16-22, 1999.

Dumais, S. et al., "Inductive Learning Algorithms and Representations for Text Categorization," In the Proc. of the 7th Int'l Conf. on Information and Knowledge Management, Nov. 1998, 8 pp.

Labalme, F. et al., "An Infomediary Approach to the Privacy Problem," Feb. 9, 1999, 24 pp., located at www.broadcatch.com/lumeria/paper1/.

Grobelnik, M. et al., "Learning Machine: Design and Implementation," In Technical Report IJS-DP-7824, Department for Intelligent Systems, J. Stefan Institute, Ljubljana, Slovenia, 1998, pp. 1-18.

Mladenic, D., "Personal WebWatcher: Design and Implementation," In Technical Report IJS-DP-7472, Department for Intelligent Systems, J. Stefan Institute, Ljubljana, Slovenia, 1996, pp. 1-8.

McCallum, A. et al., "A Comparison of Event Models for Naive Bayes Text Classification," In the Proc. of the AAAI'98 Workshop on Learning for Text Categorization, 1998, 8 pp.

Spiliopoulou, M., "The Laborious Way from Data Mining to Web Log Mining," Appeared in the Journal of Computer Systems Science and Engineering, Special Issue on Semantics of the Web, Mar. 1999.

Data Sheet, "Portal-in-a-Box, Autonomy's Automated Online Information Portal," Product Features, Autonomy, Inc., located at www.autonomy.com, presumed data prior to application filing date, no publishing date.

"Portal-in-a-Box Product Overview," Autonomy, Inc., located at www.autonomy.com, 1 pg., presumed date prior to application filing date.

"Bringing Full Automation and True Personalization to New Media Publishing," Autonomy, Inc., located at www.autonomy.com, presumed date prior to application filing date, no publishing date.

"Autonomy Technology White Paper," Autonomy, Inc., 1998, 19 pp.

* cited by examiner

My Personalized Auction Site - My History

Click here for My Recommended Page

Welcome to My Auction Site. We've presented auctions below which you have previously browsed.

My History

| | Item(s) | Price | # Bids | Time Auction Ends |
|---|---|---|---|---|
| My Interest Folder 0 Keywords: oak furniture | 4 solid oak antique chairs. ~610 | 320.00 | 0 | 4 days, 18 hours + |
| | Oak Hall seat ~610 | 200.00 | 0 | 6 days, 19 hours + |
| | Rare Old Oak Watch Crystal Cabinet ~610 | 95.00 | 0 | 6 days, 20 hours + |

| | Item(s) | Price | # Bids | Time Auction Ends |
|---|---|---|---|---|
| My Interest Folder 1 Keywords: coin roman ancient silver postage | L R G Roman SILVER Coin-98 AD-Rome's Golden Era | 24.95 | 3 | 3 days, 3 hours + |
| | 1,250 UNCLEANED ANCIENT ROMAN COINS CHEAP!!!! | 0.65 | 11 | 4 days, 23 hours + |
| | ROMAN COIN-60 AD. Emperor NERO !! Famos !!! | 18.95 | 3 | 5 days, 3 hours + |
| | Roman SILVER Coin- 200AD- Empress & Peacock!!! | 9.95 | 1 | 6 days, 20 hours + |

FIG. 6

My Personalized Auction Site - My Recommended Auctions

Click here for My History Page

Welcome to My Auction Site! - now personalized to you. We've presented auctions below which we hope you will find relevant to your interests.

5 Recommended Auctions from each interest folder

602 — My Interest Folder 0

| Item(s) | Price | # Bids | Time Auction Ends |
|---|---|---|---|
| GREAT 12 DRAWER OAK FILE CABINET — 610 | 50.00 | 0 | 6 days, 17 hours + |
| Old oak Infant/Toddler Sit-In Rocker — 610 | 5.00 | 0 | 6 days, 6 hours + |
| Old Solid Redwood Adirondack Chairs | 50.00 | 0 | 6 days, 16 hours + |
| Antique chair--take a look! | 11.00 | 1 | 6 days, 16 hours + |
| Antique Furniture: Explained and Illustrated | 5.00 | 0 | 6 days, 17 hours + |

604 — My Interest Folder 1

| Item(s) | Price | # Bids | Time Auction Ends |
|---|---|---|---|
| Roman SILVER Coin-240 AD. Military Theme !! | 18.95 | 4 | 1 days, 3 hours + |
| ROMAN COIN-365 AD | 9.95 | 18 | 1 days, 4 hours + |
| Roman SILVER Coin-250 AD. ARMY in KOSOVO !! | 19.95 | 12 | 2 days, 3 hours + |
| Greek SILVER Coin-320 BC. Alexander the Great | 49.95 | 10 | 4 days, 4 hours + |
| SILVER Coin-1st Cent BC. Roma/Chariot !! LOOK | 24.95 | 7 | 3 hours, 23 mins + |

FIG. 7

METHOD AND SYSTEM PROVIDING USER WITH PERSONALIZED RECOMMENDATIONS BY ELECTRONIC-MAIL BASED UPON THE DETERMINED INTERESTS OF THE USER PERTAIN TO THE THEME AND CONCEPTS OF THE CATEGORIZED DOCUMENT

BACKGROUND OF THE INVENTION

1. Field of the Invention

The present invention relates generally to a method and system for creating a personalized display for a user of an electronic network. More specifically, the present invention relates to a method and system for determining a user's interests from the content of electronic documents viewed by the user and providing recommended documents and recommendation packages to a user based upon the determined interests.

2. Description of Related Art

The number of Internet users continues to increase at an explosive rate. The World Wide Web ("Web") has therefore now become a significant source of information, as well as products and services.

As the numbers of Web users rise, Internet commerce, also referred to as "e-commerce" companies, and content providers are increasingly searching for strategies to target their information, products and services to those Web users. One technique that is currently being used to provide Web users with more relevant and timely information is "personalization."

Personalization can include sending a user an e-mail message tailored to that user, or providing customized Web pages that display information selected by, or considered of interest to the user. Personal merchandising, in which a unique view of an online store, featuring offerings targeted by customer profile is displayed, is another effective personalization technique. Personalization facilitates the targeting of relevant data to a select audience and can be a critical factor in determining the financial success of a Web site.

Internet companies wishing to create highly personalized sites are currently poorly served by both personalization technology vendors and customer relationship marketing product vendors. Each of these vendors offers only part of the overall solution. In addition, a significant investment of time and resources by the client is required to deploy these current solutions.

Most prior art personalization and Web user behavior (also known as clickstream) analysis technologies maintain a record of select Web pages that are viewed by users. This record, known as the "Web log" records which users looked at which Web pages in the site. A typical Web log entry includes some form of user identifier, such as an IP address, a cookie ID or a session ID, as well as the Uniform Resource Locator ("URL") the user requested, e.g. "index.html." Additional information such as the time the user requested the page or the page from which the user linked to the current Web page can also be stored in the Web log.

Traditionally, such data has been collected in the file system of a Web server and analyzed using software, such as that sold by WebTrends and Andromedia. These analyses produce charts displaying information such as the number of page requests per day or the most visited pages. No analysis is performed of the internal Web page structure or content. Rather, this software relies on simple aggregations and summarizations of page requests.

The prior art personalization methods also rely on the use of Web logs. One technology used in prior art personalization methods is the trend analysis method known as collaborative filtering. Examples of collaborative filtering systems are those of Net Perceptions (used for Amazon.com's book recommendations), Microsoft's Firefly, Personify, Inc., and HNC Software Inc.'s eHNC.

One method of collaborative filtering is trend analysis. In trend analysis collaborative filtering, the pages requested by a user are noted, and other users that have made similar requests are identified. Additional Web pages that these other users have requested are then recommended to the user. For example, if User A bought books 1 and 2 from an on-line bookseller, a collaborative filtering system would find other users who had also bought books 1 and 2. The collaborative filtering system locates 10 other users who on average also bought books 3 or 4. Based upon this information, books 3 and 4 would be recommended to User A.

Another type of collaborative filtering asks the users to rank their interest in a document or product. The answers to the questions form a user profile. The documents or products viewed by other users with a similar user profile are then recommended to the user. Systems using this technique include Reel.com's recommendation system.

However, collaborative filtering is not an effective strategy for personalizing dynamic content. As an example, each auction of a Web-based auction site is new and therefore there is no logged history of previous users to which the collaborative filtering can be applied. In addition, collaborative filtering is not very effective for use with infrequently viewed pages or infrequently purchased products.

Another technique used to personalize Internet content is to ask the users to rank their interests in a document. Recommendations are then made by finding documents similar in proximity and in content to those in which the user has indicated interest. These systems may use an artificial intelligence technique called incremental learning to update and improve the recommendations based on further user feedback. Systems using this technique include SiteHelper (Ngu and Wu, 1997), Syskill & Webert (Pazzani et al., 1996) Fab (Balabanovic, 1997), Libra (Mooney, 1998) and Web Watcher (Armstrong et al., 1995).

Another technique that has been used to personalize Internet content is link analysis. Link analysis is used by such systems as the search engine Direct Hit and Amazon.com's Alexa®. The prior art link analysis systems are similar to the trend analysis collaborative filtering systems discussed previously. In the link analysis systems, however, the URL of a web page is used as the basis for determining user recommendations.

Other prior art personalization methods use content analysis to derive inferences about a user's interests. One such content analysis system is distributed by the Vignette Corporation. In the content analysis method, pages on a client's Web site are tagged with descriptive keywords. These tags permit the content analysis system to track the Web page viewing history of each user of the Web site. A list of keywords associated with the user is then obtained by determining the most frequently occurring keywords from the user's history. The content analysis system searches for pages that have the same keywords for recommendation to the user.

This prior art content analysis systems is subject to several disadvantages. First, tagging each page on the client's Web site requires human intervention. This process is time-consuming and subject to human error. The prior art content analysis systems can only offer recommendations from predefined categories. Furthermore, the prior art content analysis systems require a user to visit the client's Web site several times before sufficient data has been obtained to perform an analysis of the user's Web page viewing history.

Other prior art content analysis systems automatically parse the current document and represent it as a bag of words. The systems then search for other similar documents and recommend the located documents to the user. Such systems include Letizia (Lieberman, 1995) and Remembrance Agent (Rhodes, 1995). These content analysis systems base their recommendations only on the current document. The content of the documents in the user's viewing history are not used.

Many Web sites offer configurable start pages for their users. Examples of configurable start pages include My Yahoo! and My Excite. To personalize a start page using the prior art method, the user fills in a form describing the user's interests. The user also selects areas of interest from predefined categories. The user's personalized start page is then configured to display recommendations such as Web pages and content-based information that match the selected categories.

This prior art method, however, is not automated. Rather, the user's active participation is required to generate the personalized Web start page. Furthermore, pages on the client's Web site must be tagged to be available as a recommendation to the user. In addition, recommendations can only be offered from predefined categories. Thus, the prior art personalized start pages may not provide relevant content to users who have eclectic interests or who are not aware of or motivated to actively create a personalized start page.

Content Web sites are increasingly generating income by using advertising directed at users of the Web sites. In the prior art, advertising was targeted to users by using title keywords. In this method, keywords in the title of a Web page or otherwise specified by the author of the page are compared with the keywords specified for a particular advertisement. Another technique used is to associate specific ads with categories in a Web site. For example, advertisements for toys might be associated with Web site categories related to parenting. However, these prior art methods require human intervention to select the keywords or to determine the associations of advertisements with particular categories. Furthermore, the prior art methods cannot readily be used to target advertisements to dynamic content.

It would therefore be an advantage to provide a method and system for providing Internet end users with relevant and timely information that is rapid to deploy, easy and inexpensive for client Web sites to use. It would be a further advantage if such method and system were available to automatically and dynamically determine the interests of a user and recommend relevant content to the user. It would be yet another advantage if such method and system were available to provide for a user a personalized recommendation package, such as an automatically generated start page for each user who visits a Web site.

SUMMARY OF THE INVENTION

One embodiment of the present invention provides a computer-implemented method for creating a personalized display of electronic-mail documents. The method includes creating a database entry including a user ID for each user of a client document server, the document server being coupled to an electronic-mail client. Requests for access to an e-mail document at the client document server are then tracked by a tracking module. Information regarding the request document is then stored, the information including information about the document that is obtained through textual analysis of the requested document. The stored information is then analyzed to construct a profile of the user requesting the document; that profile is then associated with the user ID. From the profile, interests of the user are determined utilizing a recommendation application. The user is then provided with electronic-mail notifications concerning recommended viewing of additional documents on the document server, The recommendations are based on the determined interests of a particular user.

In another embodiment of the present invention, a method for automated analysis of electronic-mail documents is provided. The method includes a user viewing a document at a client document server, the document server being coupled to an electronic-mail client. Internal content information from the viewed document is transmitted to a recommendation application, which generates recommendation links in response to the transmitted content information.

A further embodiment of the present invention provides an electronic-mail document analysis method. Through this method, internal content information of an e- mail document accessed by a user is received. Themes and concepts of the document are then determined. The document is then grouped into a folder on the client document server according to the themes and concepts; the document server being coupled to an electronic-mail client. Keywords are extracted from the documents in the folders to allow for summarization of the folder. A profile is then developed corresponding to a particular user and based on the themes and concepts of the folder. Utilizing this profile, personalized recommendations are generated with respect to viewing additional e-mail documents on the server.

In yet another embodiment of the present invention, a method is disclosed for customizing electronic-mail document information provided over an electronic network. In this method, requests by a user of a client document server for e-mail documents are tracked, Filtered content is extracted from the requested e-mail documents and analyzed. A profile is then constructed based on the analyzed content and a profile is developed. Based on the profile, interests of the user are determined and the user is provided with subsequent information as to e-mail documents for review by the user.

An embodiment of the present invention also provides a system for creating a personalized display of electronic-mail documents. The system includes means for: tracking requests by a user of a client document server for a document on the client document server; extracting filtered content from the requested document; analyzing the filtered content; constructing a profile of the user from the analyzed content determining the interests of the user; and providing the user with recommended information by email based upon the determined interests of the user.

A further embodiment of the present invention provides a system for providing personalized electronic-mail document information including an e-mail client coupled to a computing device. A processor in the system executes software instructions to extract filtered content a viewed document; analyze the filtered content determine a theme or concept of the document cluster the document into a folder according to a theme or concept in the document; construct a profile of the user from the analyzed content; determine the interests of the user based on the user profile; categorize a second document according to the theme or concept of the folder;

and recommend that the user access the second categorized document, the recommendation being based on the theme or concept of the second document.

BRIEF DESCRIPTION OF THE DRAWINGS

FIG. 6 is an example of a user profile generated by the recommendation software, according to the preferred embodiment of the present invention.

FIG. 7 is an example of a recommendation start page according to the preferred embodiment of the present invention.

DETAILED DESCRIPTION OF THE INVENTION

The present invention is a computer-implemented method and system for creating a personalized display for a user of an electronic network. The method can be used with any electronic network including the Internet and, more specifically, the World Wide Web. The preferred embodiment of the present invention includes components for analyzing Web user behavior, for remote user tracking, and for interacting with the user.

In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the claims appended hereto.

Features of the Invention:

The present invention provides a user personalization service to businesses and organizations that provide document servers. In the preferred embodiment, the invention is directed primarily to e-commerce and Internet businesses. The invention can be used to provide personalization and Web user behavior (referred to herein as "clickstream") analysis. This service enables e-commerce and Internet sites to deliver highly personalized and relevant information to each of their users. The invention can be used with, but is not limited to, content sites and e-commerce sites.

Figure 1:
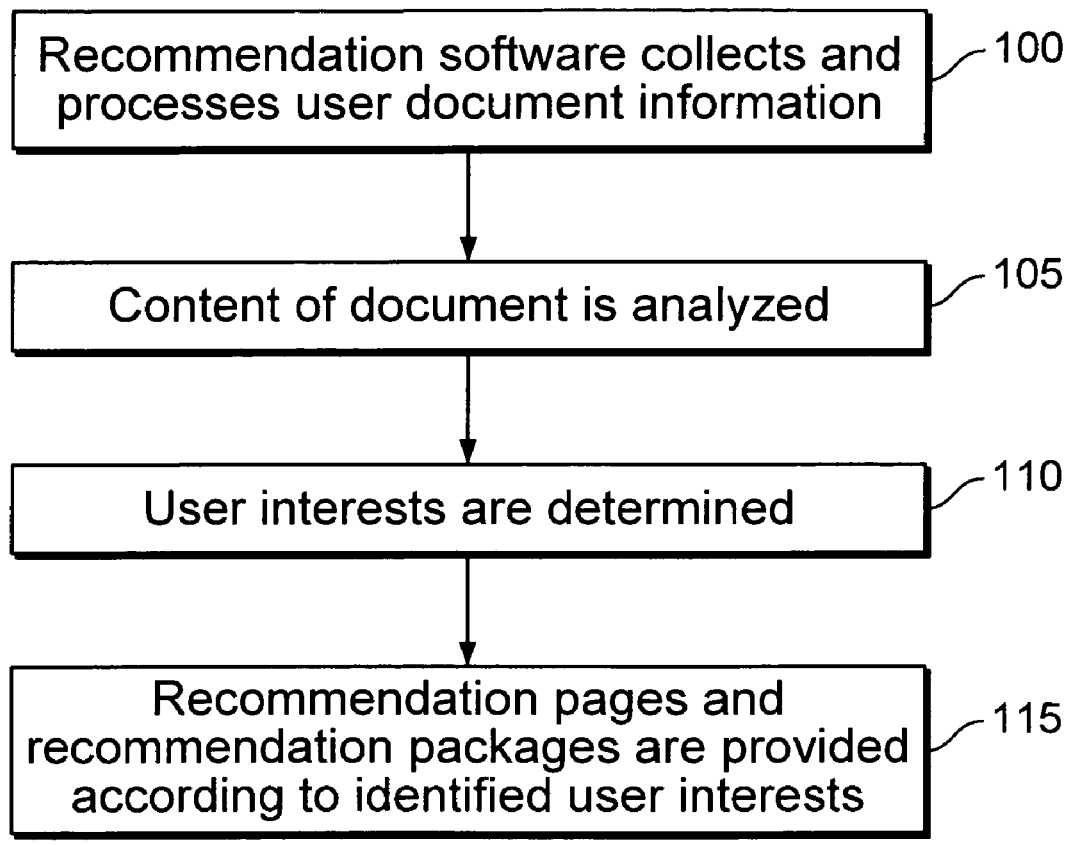
FIG. 1 is a flow diagram of the personalization method according to the present invention

FIG. 1 is a flow diagram of the personalization method according to the present invention. The invention uses the recommendation software to remotely collect and process end user behavior 100. Each user action is considered and analyzed in terms of the structural content of the document that is actually viewed by the user 105. The interests of the user are determined 110 and the user can thereby be provided with a list of recommended documents that are selected according to the analysis of the content of the documents viewed by the user 115. In addition, the invention can also be used to generate a personalized recommendation package, such as, in the preferred embodiment, a personalized start page or a personalized product catalogue for each user.

The present invention is advantageous because, by having more relevant information delivered to each end user, the client can draw users back to the client document server and can create a barrier to their switching to a competing document server. This can result in increased advertising revenue accruing to the client, and e-commerce clients can receive more revenue from sales because each user will receive more relevant suggestions of products to buy and will return more regularly.

The invention offers significant advantages to clients over the prior art personalization methods. For example, using the invention, a personalized recommendation package can be rapidly deployed, with minimal effect on the original client document server during deployment. The present invention avoids the requirement for clients to develop and invest in complex techniques for their own tracking and personalization and is therefore more economical than prior art personalization schemes. In addition, the present invention will enable clients to retain customers through improved one-to-one interaction as well as drive revenue from increased sales through cross-selling and up-selling of their products.

Definitions:

For purposes of this application, the present invention will be referred to as the "recommendation system". The use of the term recommendation system is in no way intended to limit the scope of the present invention as claimed herein. As described in further detail herein, the recommendation system can include any suitable and well-known hardware and software components, and in any well-known configuration to enable the implementation of the present invention.

The present invention is also implemented using one or more software applications that are accessible to the recommendation system. For purposes of this application, these software applications will be called the "recommendation software." The use of the term recommendation software is in no way intended to limit the scope of the present invention as claimed herein.

The personalization service according to the present invention is preferably provided by an entity, referred to for purposes of this application as the market analyst. The term "client," as used herein, refers to the operator of a document server. In the preferred embodiment of the present invention, the client is the operator/owner of a Web site. The term "user" refers herein to an individual or individuals who view a document served by the client's document server.

The recommendation system can include the market analyst's computers and network system, as well as any software applications resident thereon or accessible thereto. For purposes of this application, these components will be collectively referred to as the "marketing system." The use of the term marketing system is in no way intended to limit the scope of the present invention as claimed herein. As described herein, the marketing system can include any suitable and well-known hardware and software components, and in any well-known configuration to enable the implementation of the present invention. In the presently preferred embodiment, the marketing system is maintained separately from the client document server. However, in alternative embodiments, the hardware and software components necessary to provide the personalization service can be a part of the client document server. In these alternative embodiments, the hardware and software components can be operated by, for example, a client e-commerce or Internet business itself.

The client's computers and network system, as well as any software applications resident thereon or accessible thereto will be collectively referred to, for purposes of this application, as the "document server." The term "document" is used to represent the display viewed by a user. In a Web-based embodiment, the document is a Web page. In an e-mail embodiment, the document can be an e-mail message or listing of messages, such as an in-box.

As used herein, the term "database" refers to a collection of information stored on one or more storage devices accessible to the recommendation system and recommendation software, as described previously. The use of the term database is in no way intended to limit the scope of the present invention as claimed herein.

The database according to the present invention can include one or more separate, interrelated, distributed, networked, hierarchical, and relational databases. For example, in the presently preferred embodiment of the invention, the database comprises a document database and a user database. The database can be created and addressed using any well-known software applications such as the Oracle 8™ database. The database according to the present invention can be stored on any appropriate storage device, including but not limited to a hard drive, CD-ROM, DVD, magnetic tape, optical drive, programmable memory device, and Flash RAM.

The term "content sites" refers to Internet sites that are primarily providers of content based information such as news articles. Examples of content Web sites include CNET, MSN Sidewalk, and Red Herring. These sites can generate income from advertising, as well as syndication or referral fees for content. A content site's income can therefore be greatly dependent upon the Web site's ability to retain users.

E-commerce sites are Internet sites whose primary business is the sale of goods or services. E-commerce businesses derive revenue from the sale of goods on their Web sites. A significant factor in the success of an e-commerce Web site is the site's ability to attract and retain customers.

Syndicated content, as used herein, refers to other publisher's content that can be integrated into a client's document server.

Hardware Implementation:

Any or all of the hardware configurations of the present invention can be implemented by one skilled in the art using well known hardware components. In the presently preferred embodiment, the present invention is implemented using a computer. Such computer can include but is not limited to a personal computer, network computer, network server computer, dumb terminal, local area network, wide area network, personal digital assistant, work station, minicomputer, and mainframe computer. The identification, search and/or comparison features of the present invention can be implemented as one or more software applications, software modules, firmware such as a programmable ROM or EEPROM, hardware such as an application-specific integrated circuit ("ASIC"), or any combination of the above.

Figure 2:
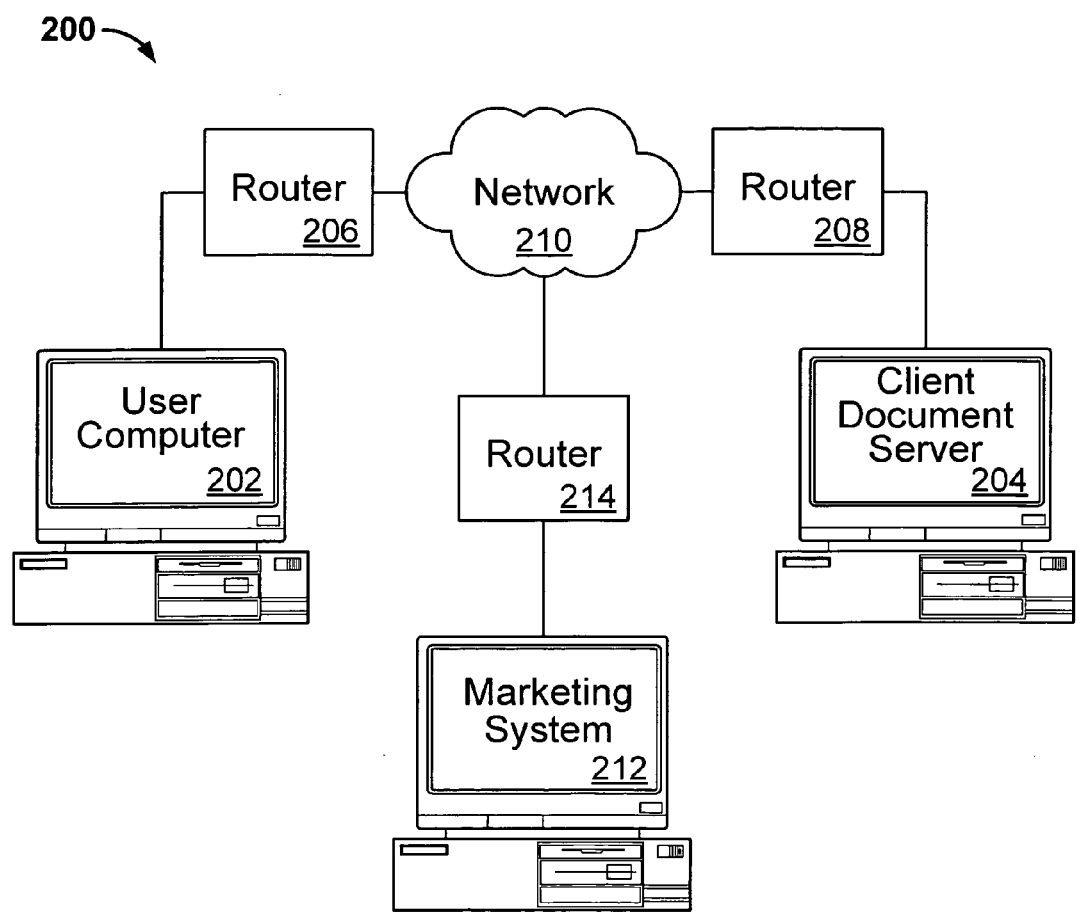
FIG. 2 is a block diagram of a computer network system according to one embodiment of the present invention.

FIG. 2 is a block diagram of a computer network system 200 according to one embodiment of the present invention. Any or all components of the recommendation system, the marketing system, the client document server, and the user's computer can be implemented using such a network system. In computer network system 200, at least one client document server computer 204 is connected to at least one user computer 202 and to at least one marketing system computer 212 through a network 210. The network interface between computers 202, 204, 212 can also include one or more routers, such as routers 206, 208, 214 that serve to buffer and route the data transmitted between the computers.

Network 210 may be the Internet, a Wide Area Network (WAN), a Local Area Network (LAN), or any combination thereof. In one embodiment of the present invention, the client document server computer 204 is a World-Wide Web ("Web") server that stores data in the form of 'Web pages' and transmits these pages as Hypertext Markup Language (HTML) files over the Internet network 210 to user computer 202. Similarly, the marketing system computer can also be a WWW server. Communication among computers 202, 204, 212 can be implemented through Web-based communication. In some embodiments of the present invention, computers 202, 204, and 212 can also communicate by other means, including but not limited to e-mail. It should be noted that a network that implements embodiments of the present invention may include any number of computers and networks.

Software Implementation:

Any or all of the software applications of the present invention can be implemented by one skilled in the art using well known programming techniques and commercially available or proprietary software applications. The preferred embodiment of the present invention is implemented using an Apache Web server and Web-based communication. However, one skilled in the art will recognize that many of the steps of the invention can be accomplished by alternative methods, such as by e-mail.

In the preferred embodiment of the invention, the operating system for the marketing system is Red Hat™ Linux™. However, any other suitable operating system can be used, including but not limited to Linux™, Microsoft Windows 98/95/NT, and Apple OS.

The recommendation software can include but is not limited to a Web server application for designing and maintaining the market analyst's Web site, a database application for creating and addressing the database, software filters for screening the content of documents served by the client's document server, a text clustering application, a text categorization program, a presentation module, a spider and/or search engine for seeking relevant documents, an e-mail application for communication with users, a spread sheet application, and a business application for verifying orders, credit card numbers, and eligibility of customers.

The recommendation software can include any combination of interrelated applications, separate applications, software modules, plug-in components, intelligent agents, cookies, JavaBeans™, and Java™ applets. (Java and all Java-based marks are trademarks or registered trademarks of Sun Microsystems, Inc. in the United States and other countries.) The software applications that comprise the recommendation software can be stored on any storage device accessible to the marketing system, including but not limited to a hard drive, CD-ROM, DVD, magnetic tape, optical drive, programmable memory device, and Flash RAM. It will be readily apparent to one of skill in the art that the software applications can be stored on the same or different storage devices.

In the preferred embodiment of the invention, the clustering application is implemented using the C programming language. However, in alternative embodiments, the clustering application can be implemented using other well-known programming languages, including but not limited to C++, Pascal, Java, and Fortran. The clustering application is preferably stored on the marketing system, but can alternatively be stored on any component accessible to the marketing system.

In the preferred embodiment of the invention, the presentation module is implemented using Perl scripts and SQL. However, in alternative embodiments, the presentation module can be implemented in any other suitable programming language. The presentation module is preferably stored on the marketing system, but can alternatively be stored on any component accessible to the marketing system.

In the preferred embodiment of the invention, the tracking module that is associated with the client's document server is implemented using Perl scripts. However, in alternative embodiments, the tracking module can be implemented using other well-known programming languages and software applications including but not limited to TCL, Java™ servlet, and Microsoft Active Server Page ("ASP") applications. The tracking module is preferably stored on the client's document server, but can alternatively be stored on any component accessible to the document server.

In the preferred embodiment of the present invention, content analysis and the generation of the user profiles, recommendations, and recommendation packages are all performed by the marketing system and recommendation software. However, in alternative embodiments of the present invention, any or all of these functions can also be performed by the client document server. The client document server performs the functions of data collection, data transfer to the marketing system and presentation of the recommendations and recommendation packages to the user.

In the preferred embodiment of the invention, the database is implemented using Data Konsult AB's MySQL. However, in alternative embodiments, the tracking module can be implemented using other software applications including but not limited to Postgres, and Oracle® and Informix® database applications. The database is preferably stored on the marketing system server, but can alternatively be stored on any component accessible to the marketing system.

The recommendation software is preferably a separate application from the marketing system operating system. However, one skilled in the art will readily recognize that the present invention can also be fully integrated into the marketing system operating system.

DESCRIPTION OF THE EMBODIMENTS

Figure 3:
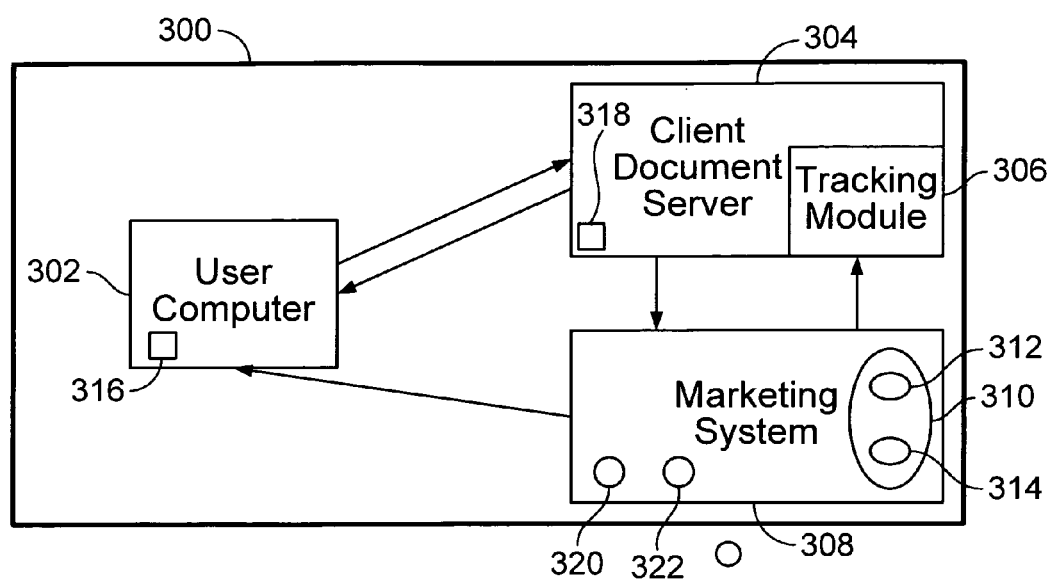
FIG. 3 is a diagram of the system for Internet personalization, according to the preferred embodiment of the invention.

FIG. 3 is a diagram of the system 300 for Internet personalization, according to the preferred embodiment of the invention. A tracking module 306 is installed at the client document server 304. In the presently preferred embodiment, a Web site manager embeds Hypertext Markup Language ("HTML") links to the marketing system in the client document server and, specifically, on the client document server's start page. While the tracking module is implemented as a Perl module embedded in Apache in the preferred embodiment, the tracking can alternatively be implemented in other ways, for example using hypertext links.

At the client document server 304, the tracking module logs every request made by every user for documents and sends this information to the database 310 associated with the marketing system 308. In the preferred embodiment of the present invention, the database 310 includes a document database module 312 for storing information relating to the document and contents of the document, and a user database module 314 for storing information relating to the user's document viewing behavior.

In the preferred embodiment, each user is sent a user-identifier ("user ID") 316 that is stored on the user's computer 302. The tracking module sends the user ID and a document identifier ("document ID") 318 to the marketing system 308 in response to each user's request to view a document on the client document server 304. The recommendation software 320 is then used to process this information to construct a profile for the user and to make recommendations based thereupon. In the preferred embodiment, the presentation module 322 is operable to configure a recommendation package for the user into any desired format or appearance.

Figure 4:
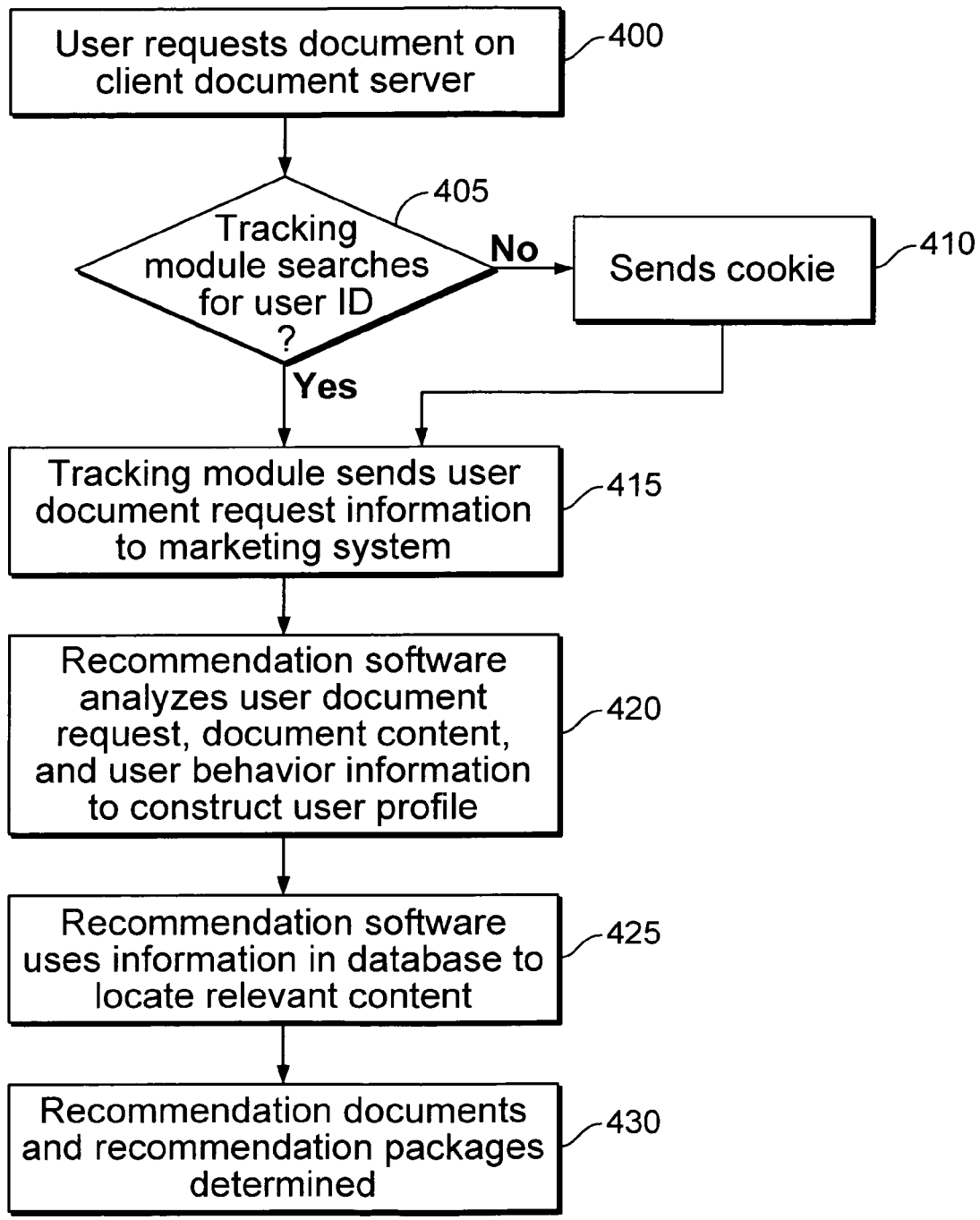
FIG. 4 is a flow chart of the method for Internet personalization, according to the preferred embodiment of the invention

FIG. 4 is a flow chart of the method for Internet personalization, according to the preferred embodiment of the invention. A tracking module is installed at a client document server. In the preferred embodiment of the present invention, the client document server is a Web site. However, in alternative embodiments, the present invention is implemented with a client e-mail or File Transfer Protocol ("ftp") system.

In this preferred embodiment, when a user requests a document on the client document server 400, the tracking module searches for a user ID on the user's computer 405. If a user ID is not located, the tracking module creates a new entry in the database and sends a user ID to the user's computer 410. In the preferred embodiment, this involves sending a cookie to the user's Web browser. However, any other appropriate identifier can alternatively be used, such as an IP number.

The tracking module installed at the client document server logs every request made by every user for documents and sends this information to the marketing system. Thus, when the user requests a different document in the client's document server, the tracking module logs this action by sending the user ID and a document identifier ("document ID") to the database 415. In the presently preferred embodiment, the document ID is the URL of the particular Web page. However, other document IDs such as a product number can also be used.

In alternative embodiments of the present invention, the tracking module can send additional information, such as the time spent viewing a document and the price of items displayed on the document to the marketing system database. The subsequent actions on the client document server of any user who is entered in the marketing system database are similarly recorded in the marketing system database.

In yet another embodiment of the present invention, the marketing system can act as a proxy server. In this embodiment, the tracking module could be installed at either the marketing system or the client document server, or at both. In this embodiment, the user requests documents from the marketing system. In response to such request, the marketing system requests the appropriate documents from the client document server and provides them to the user.

In the preferred embodiment, documents and meta-data about the documents are stored in the document database module of the database. The document database can include other information obtained from the client, such as the price or size of an item. The user database module can include information obtained from the user, for example, whether the user placed a bid on an item, the user's name and address, which documents were viewed by the user, whether the user purchased an item, user profile or the time the user spent viewing a particular document. Information obtained from text analysis, document clustering, or document categorization can also be stored in the user database module.

As the user browses through the client's document server, the marketing system uses the recommendation software to process the user's behavior, analyze the content of the user's document views and construct a profile for the user 420.

The recommendation software uses the information in the user database to make a determination of what interests the particular user. For example a user who browsed an auction Web site for antique Roman coins and baseball cards would be determined to have two interests. These interests are determined by an analysis of the actual content of each browsed document.

The recommendation software uses any or all of the gathered information about the user to search through the content on the client's document server to find the local content considered most relevant to that particular user 425. In the preferred embodiment of the invention, the marketing system regularly retrieves the content for each document and/or product on the client document server, for example, once per hour.

The recommendation software analyzes each document a user views in terms of the (a) content and (b) ancillary information related to a user's viewing a document. The present invention uses this analysis of document content to provide a model for automatically deriving reasonable inferences regarding a user's interests and intentions in viewing particular documents. This model can then be used to generate a list of additional documents on the client document server, or elsewhere such as on another document server, that might be of interest to the user. These "recommendation documents" and "recommendation packages" provide a suggested product and/or document that is tailored to a user's interests and to the product and/or document that a user is currently viewing.

The marketing system sends the recommended document(s), or a link to the recommended document(s), back to the client's document server 430. The recommendations can include but are not limited to URLs, product numbers, advertisements, products, animations, graphic displays, sound files, and applets that are selected, based on the user profile, to be interesting and relevant to the user. For example, the most relevant ad for any page can be rapidly determined by comparing the current user profile with the description of the available advertisements.

The user recommendations can be provided as a part of a personalized recommendation package. In the preferred embodiment of the invention, the recommendation package is a personalized Web start page for the user. For an e-mail server-based embodiment, the recommendation package can be personalized e-mail. The recommendation package gives each end user a unique view of the client document server by showing information that is relevant to that user.

In the preferred embodiment, the document displayed to the user by the client document server includes a hypertext link that is used to access the personalized Web start page. When the user clicks on the hypertext link, the personalized start page is dynamically generated by the recommendation software at the marketing system. Each user will see a different view of the Web site based on the user's personal likes or dislikes, as determined automatically by the user's previous browsing behavior. Such automatic personalization minimizes the need for the client to specifically control document server content and permits the client to transparently provide information regarding the user's interests.

When the user clicks on a link to this personalized Web page on the client's document server, the personalized page is served to the user from the marketing system. Although the page is served from the marketing system, the presentation module is operable to configure the personalized page to conform to the client's own branding and image, thereby maintaining the look and feel of the client's site. In addition, the Uniform Resource Locator ("URL") link, which is the "Web address" of the personalized page is configured to appear to be a link to the client document server.

In alternative embodiments of the present invention, the personalized Web page does not have to maintain the look and feel of the client's document server, but can have any desired appearance. In such embodiments, the presentation module is operable to configure the recommendation package into any desired format or appearance. Furthermore, there is no requirement that URL link provided to the user appear to link the Web page to any particular Web site. In one embodiment of the present invention, the user can switch back at any time to the from the personalized recommendation package, such as the personalized Web start page, to a non-personalized document, such as the generic start page of displayed by the client document server.

In another embodiment of the invention, portions of the client's document server can be mirrored on the marketing system. The recommendation software can then search through the mirrored client document server for content relevant to the particular user. The recommendation software can also optionally include syndicated content from the marketing system or from the client's syndication providers in the personalized page. New standards based on XML such as Information Content Exchange ("ICE") will facilitate the incorporation of syndication into Web sites.

The recommendation software according to the present invention uses information regarding the client's document server structure in the personalization analysis. For example, if a user typically looks at books in a particular category of a bookseller's Web site, this information will be used by the recommendation software, in addition to any content information, to create a personalized view of the site for the user.

Figure 5:
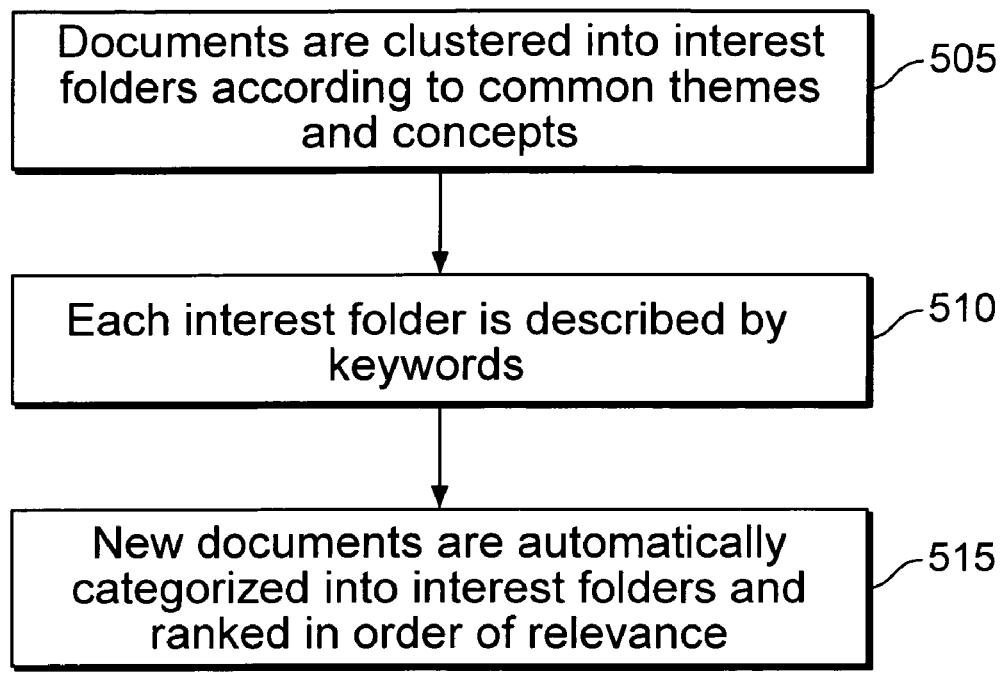
FIG. 5 is a flow chart illustrating the formation of interest folders, according to the present invention.

FIG. 5 is a flow chart illustrating the formation of interest folders, according to the present invention. The recommendation software thereby extracts and organizes the interests and document viewing habits of the user.

In the preferred embodiment of the invention, the recommendation software uses a statistical process referred to herein as document clustering to group together those documents of the client document own server that have been viewed by the user according to their common themes and concepts. For each individual user, the recommendation software clusters those documents that have the most themes and concepts in common with one another into interest folders 505. In the preferred embodiment, the recommendation software continually monitors each user and continually updates the user's interest folders and profile.

The set of interest folders for each user can also be used to target advertisements to each user rather than, or in addition to content. In the presently preferred embodiment, each advertisement has an associated simple description. This description is specified by the creator of the ad. The description can be associated with the advertisement by methods including embedding in meta-language tags or in XML.

Document clustering according to the present invention includes the automatic organization of documents into the most intrinsically similar groups or segments. As an example of the application of using document clustering, a user who enters the search term "Venus" into a search engine will likely receive documents about (a) Venus the planet; and (b) Venus the goddess. In the preferred embodiment of the present invention, the search results would therefore be clustered accordingly into two separate interest folders. None of the concepts in groups (a) and (b) are predefined but are formed as a result of the intrinsic similarity of the documents in each cluster. As a result, the clustering framework is very flexible for automatic organization of documents into groups.

In the preferred embodiment of the present invention, the recommendation software uses a proprietary clustering algorithm to form the user interest folders. The clustering algorithm uses the textual content of the documents viewed by a user, in combination with structural information about the document server, and ancillary information about the user to determine the interest folders for a user.

In an alternative embodiment, a clustering algorithm is also used to segment large numbers of users into different user folders. However, one skilled in the art would readily recognize that any other suitable clustering algorithm could also be used in alternative embodiments of the invention.

One significant feature of the clustering algorithm used by the invention is that the output of the algorithm can be readily viewed and understood. Each document cluster (interest folder) is described by the most relevant keywords of the documents within the document cluster 510. This feature enables both users and marketers to understand and control the degree of personalization and targeting that is made.

The recommendation software can also be used to categorize documents 515. Document categorization is the automatic placement of new documents into existing predefined categories. Document categorization is used in the preferred embodiment of the present invention to select, from a database, documents that match a user's interest folders. A document categorizer can learn how to place new documents into the correct categories so that, for example, a new Web page or product can be automatically placed into the correct user interest folder. As an example, given a user interest folder containing documents about Roman coins, a document categorizer could select the most relevant products for that user from a particular Web site.

Because Web pages are diverse in structure and form, the recommendation software uses customizable filters that extract only the content deemed to be relevant to users. In addition to extracting the content of each page, the recommendation software uses filters to extract structure within this content. The present invention can also use adaptive filtering algorithms that analyze a Web site and review different filter known structures to automatically find an appropriate filter for a particular Web site.

For example, an on-line bookseller's Web page can display information regarding a book that is available for purchase. The Web page can include such structure as: book price, author, description, and reviews. The fields of the document database are preferably customized to the bookseller's Web page such that the names of each of these fields can automatically be stored therein. The fields of the user database are similarly configured for automatic storage of information obtained from the user. This information is then included in the recommendation software's analysis.

In the preferred embodiment of the invention, the recommendation software uses proprietary filters that are specific for each Web site. For example, each of two music distribution Web sites would have its own specific customized filter. Alternatively, the recommendation software can use filters that are specific for different types of Web sites. As an example, the recommendation software can have separate specific filters for such sites as auction Web sites, bookseller Web sites, and music Web sites. One skilled in the art would recognize that the recommendation software can also use any suitable commercially available filters.

In the preferred embodiment, each interest folder is automatically summarized in terms of the most relevant keywords from the associated collection of pages in the folder. Keywords can be determined, for example, by using an information theoretic measure such as "Minimum Message Length" ("MML") to determine the most relevant words to define a user's interest folder. Filters, such as the removal of "stopwords," can be used to screen out common prepositions, articles, possessives, and irrelevant nouns, adjectives, etc.

The keywords for a user's interest folders can be determined in any appropriate manner. In one embodiment of the invention, the message length of sending each word using the population frequency of the word is determined. This message length is referred to herein as the population message length of the word. The message length of sending each word using the interest folder's frequency of the word is then determined. This message length is termed herein the interest folder message length of the word. For each keyword, the interest folder message length of that keyword is then subtracted from the population message length of the word. The keywords for the user's interest folders are defined to be the words in which this distance is the greatest.

FIG. 6 is an example of a user profile 600 generated by the recommendation software, according to the preferred embodiment of the present invention. The profile shown in the personalized Web page of FIG. 6 comprises two different interest folders 602, 604 for a user of an on-line auction Web site. Each interest folder contains pages which are intrinsically similar to one another and dissimilar to pages in other interest folders.

A specific interest folder contains a set of links 610 to auctions the user has viewed that are related to the theme of the interest folder. An interest folder can also include additional information including but not limited to information regarding the history of the user's Internet viewing, recommendations for the user, a summary of the user's purchases. In the example illustrated in FIG. 6, each interest folder also has an associated set of keywords 612 that summarize the most important concepts of the particular interest folder, as determined by the recommendation software.

In the preferred embodiment of the present invention, the user can display and edit the user profile of FIG. 6. For example, if the user is no longer interested in Roman antiquities, this interest folder 612 can be deleted from the user profile.

It is common for a user to regularly return to particular Web sites to look for specific information having a similar theme. For example, a user of an on-line auction Web site who collects Roman coins might frequently return to the antiquities section of the auction Web site. The present invention uses the profile of each user to automatically find other relevant pages in the Web site to recommend to the user. In the previous example, the recommendation software would search through all of the auctions currently running on the on-line auction Web site to search for those that match most closely with each of the user's interest folders.

The present invention uses a sophisticated search engine that can incorporate any or all of the content and ancillary information in the user profile. FIG. 7 is an example of a recommendation start page 700 according to the preferred embodiment of the present invention. The user's interest folders 602, 604 are displayed on the recommendation document. Each interest folder includes links to documents 610 that the recommendation software has selected based upon the user's profile. In the previous example of the Roman coin collector, the folder relating to this interest 604 includes links to auctions for Roman and other ancient coins.

In the preferred embodiment of the present invention, a user can view and manage the user's profile. Thus, in the previous example, the user may wish to remove certain sections of the profile in order to stop receiving recommendations about Roman coin auctions. The recommendation software user interface allows users to delete interest folders, add extra keywords to an interest folder, or create their own interest folder from pages on a client document server.

Because the user profiles are based primarily on keywords, the present invention can be used to not only target a user with content from the same Web site that the user is currently browsing, but also with content from other Web sites. For example, a user with an interest in collecting Roman coins could be automatically targeted with content from on-line publications related to antiquities.

While the present invention is designed to automatically match users with relevant content, it is recognized that a client might wish to customize the manner in which users receive special promotions, event announcements and special news items. In the example of the Roman coin collector, a marketer of cruises might wish to target the collector with a promotion for a cruise of the Mediterranean.

To enable marketers to interact easily with their users, the present invention provides the functionality to allow a marketer to search through the users' profiles using keywords in a standard search paradigm. Groups of users can be selected and then matched with relevant content either by hand or automatically using the present invention's content matching technology.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

One skilled in the art will readily recognize that, in an embodiment that features Web-based interaction between the user, the market analyst, and the marketer, there are many different ways in which communication can be implemented through the Web page graphical user interface. For example, this communication can be implemented using elements including but not limited to a dialog box, check box, combo box, command button, list box, group box, slider bar, text box.

In the preferred embodiment of the present invention, all client's and users use computer-implemented methods to interact with the market analyst, for example, using a Web page or e-mail. However, in alternative embodiments, one or more such customers can communicate with the market analyst using other methods of communication, including but not limited to telephone, fax, and mail. For example, in one embodiment, a user can request modifications to the user's profile by making a telephone call to a client or to the market analyst.

What is claimed is:

1. A computer-implemented method for creating a personalized display of electronic-mail documents for a user, comprising the steps of:

creating a database entry in a database, the entry including a user ID for each user of a client document server, wherein the client document server is coupled to an electronic-mail client;

tracking requests by the user for access to at least one document on the client document server, wherein the requests are tracked using a tracking module;

storing, in the database, information regarding each document requested by the user, the information regarding each document comprising information obtained from textual analysis of each of the requested documents;

analyzing the stored information including the information obtained from textual analysis of each document requested by the user to construct a profile of the user, wherein the profile of the user is associated with the user ID and wherein analyzing the stored information comprises:

parsing a set of stored information including information regarding at least one document viewed by the user; and determining at least one common theme or concept of the set of stored information;

determining interests of the user based on at least the user profile, the determination being made by at least one recommendation software application; and providing the user with electronic mail notifications comprising recommendation information with regard to viewing additional documents on the client document server, wherein the recommendation information notifications are generated based upon at least the determined interests of the user.

2. The method of claim 1, wherein the recommendation information is further based on an inference of whether the user intends to view an additional document on the client document server.

3. The method of claim 1, wherein the recommendation information is further based upon analysis of advertisements, products, animations, graphic displays, sound files, applets, or services identified in the additional documents on the client document server.

4. The method of claim 1, wherein the stored information comprises keywords identified in the client document accessed by the user.

5. The method of claim 1, wherein the stored information comprises a Web site identified in the client document accessed by the user.

6. The method of claim 1, wherein the stored information comprises an embedded HTML link identified in the client document accessed by the user.

7. The method of claim 1, further comprising the step of categorizing at least one additional document on the client document server according to the at least one common theme or concept determined from the set of stored information.

8. The method of claim 7, further comprising the step of recommending to the user the at least one categorized document, wherein the recommendation is generated by the at least one recommendation software application.

9. The method of claim 1, wherein the analyzing step further comprises the step of using a first filter to extract select content from information obtained from each user requested and textually analyzed document.

10. The method of claim 9, further comprising the step of using a second filter to extract structure information from within the extracted content.

11. An electronic-mail document analysis method comprising the steps of:

receiving internal content information of at least one document accessed by a user;

determining at least one theme or concept of the at least one document accessed by the user;

grouping the at least one document accessed by the user into at least one folder on a client document server according to at least one theme or concept of the at least one document, wherein the client document server is coupled to an electronic-mail client;

summarizing the at least one folder by extracting at least one keyword representing the at least one theme or concept of the at least one document grouped into the folder;

deriving a user profile corresponding to the user based on the at least one theme or concept of the folder; and utilizing the profile to generate personalized recommendations for the user, wherein the personalized recommendations are presented on a Web page that is accessed using a link Provided in an electronic-mail message, the personalized recommendations corresponding to additional documents on the client document server to be viewed by the user.

12. The method of claim 11, further comprising the step of modifying the user's profile in accordance with instructions provided by the user.

13. The method of claim 11, further comprising the step of configuring the Web page to maintain the look and feel of the client's document server as accessed via the electronic-mail client.

14. A method of using a computer to customize electronic-mail document information provided to a user over an electronic network, comprising the steps of:

tracking requests by a user of a client document server for at least a first requested document on the client document server, wherein the client document server is coupled to an electronic-mail client;

extracting filtered content from the at least first requested document;

analyzing the filtered content of the at least first requested document;

determining, from the analyzed filtered content, at least one theme or concept of the at least first requested document;

clustering the at least first requested document into at least one folder according to the at least one theme or concept identified in the at least first requested document;

constructing a profile of the user from the analyzed content;

determining, based on the user profile, the interests of the user;

categorizing at least a second document according to the at least one theme or concept of the at least one folder; and determining whether to recommend to the user that the user view the at least second categorized document; and providing the user with recommendation information by electronic-mail based upon the determined interests of the user as the determined interests of the user pertain to the at least one theme or concept of the at least second categorized document.

15. The method of claim 14, further comprising the steps of:

summarizing the at least one folder to extract at least one keyword representing the theme or concept of the folder; and searching the at least second document for the at least one keyword to categorize the at least second document.

16. A system for creating a personalized display of electronic-mail documents for a user, comprising:

means for tracking requests by a user of a client document server for at least one document on the client document server, wherein the client document server is coupled to an electronic-mail client;

means for extracting filtered content from the requested document;

means for analyzing the filtered content of the at least one requested document;

means for determining at least one theme or concept of at least a first requested document based on, at least, the analysis of the filtered content of the at least one requested document;

means for clustering the at least first requested document into at least one folder according to the theme or concept of the document;

means for constructing a profile of the user from the analyzed content;

means for determining, based on the user profile, the interests of the user;

means for categorizing at least a second document according to the at least one theme or concept of the at least one folder; and means for recommending to the user that the user access the at least second categorized document based on the at least one theme or concept of the at least one folder; and means for providing the user with recommendation information by electronic-mail based upon the determined interests of the user, as the determined interests of the user pertain to the at least one theme or concept of the at least second categorized document, wherein the recommendation information comprises an indication of whether the user should access another document on the client document server.

17. The system of claim 16, further comprising:

means for summarizing the at least one folder to extract at least one keyword representing the theme or concept of the folder; and means for searching the at least second document for the at least one keyword to categorize the at least second document.

18. A system for providing personalized electronic-mail document information to a user, comprising:

an electronic-mail client coupled to at least one computing device, the at least one computing device comprising a memory device having embodied therein software instructions relating to the management of at least one electronic document viewed by the user via the electronic-mail client;

a processor in communication with the memory device, the processor configured to execute the software instructions to perform a method comprising:

extracting filtered content from the at least first viewed document;

analyzing the filtered content of the at least first viewed document;

determining at least one theme or concept of the at least first viewed document;

clustering the at least first requested document into at least one folder according to the at least one theme or concept in the document;

constructing a profile of the user from the analyzed content;
determining the interests of the user based on the user profile;
categorizing at least a second document according to the at least one theme or concept of the at least one folder; and recommending to the user by electronic-mail that the user access the at least second categorized document, wherein the recommendation is based on the at least one theme or concept of the second categorized document.

* * * * *

UNITED STATES PATENT AND TRADEMARK OFFICE
CERTIFICATE OF CORRECTION

PATENT NO. : 7,158,986 B1
APPLICATION NO. : 09/361678
DATED : January 2, 2007
INVENTOR(S) : Jonathan Oliver et al.

It is certified that error appears in the above-identified patent and that said Letters Patent is hereby corrected as shown below:

Item (54) On The Title Page and in col. 1, lines 1-7, should read, as follows:

--METHOD AND SYSTEM FOR PROVIDING A USER WITH PERSONALIZED RECOMMENDATIONS BY ELECTRONIC-MAIL BASED ON DETERMINED INTERESTS OF THE USER PERTAINING TO A THEME OR CONCEPT OF A CATEGORIZED DOCUMENT--

Signed and Sealed this

First Day of April, 2008

JON W. DUDAS
*Director of the United States Patent and Trademark Office*